United States Patent [19] [11] 4,064,297
Power et al. [45] Dec. 20, 1977

[54] INTERLAMINAR FLOCKED LAMINATE

[75] Inventors: George Edward Power; Dudley Wulfekotter, both of Cincinnati, Ohio

[73] Assignee: Formica Corporation, Cincinnati, Ohio

[21] Appl. No.: 617,928

[22] Filed: Sept. 29, 1975

[51] Int. Cl.² ............................................. B32B 33/00
[52] U.S. Cl. .......................................... 428/86; 428/90
[58] Field of Search .................................... 428/86, 90

[56] References Cited
U.S. PATENT DOCUMENTS

| 2,491,530 | 12/1949 | Stubblebine | 428/86 |
| 2,494,848 | 1/1950 | Whitelegg | 428/86 |
| 3,900,650 | 8/1975 | Sedore | 428/86 |
| 3,900,651 | 8/1975 | Hoppe | 428/86 |

Primary Examiner—Marion E. McCamish
Attorney, Agent, or Firm—Frank M. Van Riet

[57] ABSTRACT

An article of manufacture comprising a heat and pressure consolidated assembly comprising, in superimposed relationship, 1. a thermoset resin impregnated, decorative paper layer and
2. a thermoset resin impregnated paper sheet having
   a. a dry adhesive coating positioned on one side thereof and
   b. flocked fiber implanted in said adhesive in generally a perpendicular orientation to said sheet, is disclosed.

9 Claims, No Drawings

INTERLAMINAR FLOCKED LAMINATE

BACKGROUND OF THE INVENTION

In the manufacture of laminates, especially decorative laminates, it has generally been necessary to somehow treat or condition the backmost side of the laminate before it can be readily adhered to a substrate. For example, in the production of horizontal and vertical decorative surfaces, decorative laminates of up to about 1/16 inch in thickness are adhesively bonded to substrates, usually flakeboard etc., by coating the side of the substrate to which the laminate is to be bonded, with a low cost, water borne adhesive such as urea-formaldehyde or polyvinyl acetate latex (white glue). In order to acheive effective and long-lasting adherence of the laminate to the substrate, it has been necessary to sand the backmost surface of the laminate because this surface is normally smooth due to the use of a glassine separator sheet in the laminate manufacture. Attempts have been made to eliminate the sanding operation because of its expense and undesirable dust production by attaching a polyvinyl acetate layer to the backmost side of the laminate and then activating this layer with heat or a solvent before applying it to the substrate, see U.S. Pat. No. 3,551,283 and No. Re. 27644.

This method of circumventing the sanding operation has not proven to be commercially attractive and alternative means have been sought for some considerable time.

SUMMARY OF THE INVENTION

We have now discovered a laminate component which need not be sanded before it can be adhesively bonded to a substrate. The fact that no sanding is necessary results in a more economical laminate production process because a plateless pack may be employed in the laminating press and, once heat and pressure consolidated, the laminates of the pack may be trimmed en mass rather than individually as is required when sanding of the back is necessary. Trimming the laminates in this manner, because they are relatively thin and brittle, causes less breakage of corners etc. and consequently production is increased. Furthermore, the elmination of the sanding operation also eliminates the need to dispose of the sanding dust per se which, of course results in the saving of both time and money.

DESCRIPTION OF THE INVENTION INCLUDING PREFERRED EMBODIMENTS

As mentioned briefly above, we have now discovered a novel laminate component which can be incorporated into a laminate and adhesively bonded to a self-supporting substrate without the necessity of treatment of the backmost side of the laminate.

This laminate component comprises
1. a thermosettoing resin impregated paper sheet,
2. a dry adhesive coating positioned on one side of said sheet, said adhesive being substantially non-flowable in said dry state when subjected to the conditions of heat and pressure laminate consolidation, and
3. flocked fibers implanted in said adhesive in generally a perpendicular orientation to said sheet.

This laminate component having one surface to which a flock has been adhesively bonded and whose bulk has been impregnated with a thermosetting resin is useful as the backmost layer on a decorative laminate. After heat and pressure consolidating it together with the other laminate components, the resultant article may be bonded directly to a substrate without standing.

While not wishing to be bound to any particular theory as to why the instant laminate components function as they do, it is believed that the flock thereof simulates the condition which is achieved when conventional decorative laminate backs are sanded. Microscopic examination of a sanded laminate back shows that it contains a multitude of fiber-like appendages. Some of these appear to be actual paper fibers which are lifted up from the paper surface by the sandpaper particles while others appear to be very fine ribbons of the resin impregnated paper cut by the sandpaper. They resemble wood shavings achieved when cutting lumber with a hand-held plane or coiled metl strips achieved when machining ductile metals. It appears that the presence of these appendages is extremely important to the integrity of the adhesive joints made on the finished article when such a laminate is bonded to a typical wood particleboard substrate. Where no appendages exist, the back surface of the laminate presents a smooth surface and when the interface of this surface and the adhesive is placed under stress, such as, for example, when the article shrinks during low humidity conditions, a crack initiates in the interface and runs along the interface until the stress is relieved.

The surface presented to the bonding adhesive by the flocked surface of the laminate component of the instant invention is fibrous. The adhesive surrounds each fiber, i.e., each fiber is implanted in the adhesive layer. This results in a laminate-adhesive interface which is pierced by numerous fibers since they are substantially perpendicular in orientation with respect to the plane of the interface. If a crack initiates at this interface, it will not be able to propagate by running along the interface because as the crack front approaches a fiber, it will encounter a region which is able to accept the stress, i.e., the fiber itself, and therefore will be stopped. The adhesive joint will hence remain unbroken.

Any resinous system known to be effective for the impregnation of paper sheets to be used in the production of laminates may be used to produce the novel laminate components of the instant invention. The resins may be those useful for the so-called "high pressure" or the so-called "low-pressure" laminate systems, i.e., those wherein the laminates are formed under heat and pressure consolidation whereon the pressure employed is from about 1200 to about 1600 psi (high pressure) or from about 100 to about 400 psi (low pressure). These resins are all well known in the art and include those formed from the aminotriazines and aldehyde via condensation thereof. Suitable triazines include melamine, formoguanamine, acetoguanamine, benzoguanamine, ammeline, ammelide and the like. Suitable aldehydes include formaldehyde, acetaldehyde, benzaldehyde, furfural, acrolein, butyraldehyde and the like. Phenol/aldehyde and urea/aldehyde condensation products may also be used including those produced from urea per se, thiourea, methylene urea, ethylene urea, phenol per se, resorcinol, cresol, xylenols, t-butyl catechol, bisphenol A and the like. Further exemplary resinous compositions of this type are disclosed in U.S. Pat. Nos. 2,197,357 and 3,033,823, hereby incorporated herein by reference.

Further examples of impregating resins useful herein include resinous admixtures of, for example, a nitrile rubber latex, a water-dispersible melamine/formaldehyde resin and a polyvinyl halide latex (U.S. Pat. No. 3,798,117); mixtures of melamine/formaldehyde resins and thermoplastic acrylic copolymers (U.S. Pat. No. 3,736,220; 3,589,974; 3,547,769; 3,218,225) which patents are also hereby incorporated herein by reference. Preferred are mixtures of a melamine/-formaldehyde condensation product and a cross-linkable copolymer of ethyl acrylate and acrylonitrile (80-20/20/80) wherein the mixture comprises from about 50–95%, by weight, based on the total weight thereof, of the melamine/formaldehyde resin. The cross-linking sites on the copolymers are derived from hydroxyl or carboxy containing monomers copolymerized therewith in amounts of up to about 15%. Effective cross-linking sites can also be created in the copolymer by chemical modification thereof.

Another example of useful impregnating resins are those based on diallyl phthalate and disclosed in U.S. Pat. No. 3,049,458, hereby incorporated herein by reference. These resins may be used as such or may be cross-linked by any known means after impregnation. They are preferably used with synthetic polymer papers, especially those produced from polyacrylonitrile.

The paper sheet may comprise a sheet of any known material such as those disclosed in the above incorporated references. Such sheets include those of kraft paper, α-cellulose paper, asbestos paper, regenerated cellulose paper, paper produced from chopped rags, rayon, linen etc., X-creped paper and the like.

The adhesive which is utilized to bond the flock to the impregnated paper sheet can comprise any adhesive material or composition which is non-flowable in its dried state under the conditions of heat and pressure used to produce the laminate therefrom. The adhesive must act to bond the flock to the impregnated paper sheet and also, preferably acts as a barrier which prevents the resin impregnated into the paper sheet from surrounding the flock particles during pressing. We have found that best results are achieved when the resin impregnated into the paper sheet, the flocking adhesive, the flocked fiber and the adhesive used to bond the laminate to the substrate are all "compatible". By "compatible" is meant that each of these components reacts substantially the same in the presence of a solvent. For example, if the solvent is water, the resin imprenant should be water-soluble or water-dispersible. The flocking adhesive should be water-soluble or, at least, hydrophilic. The flock should also be hydrophilic and the substrate adhesive should be water-borne. Since it is apparent that the flocked fiber must be bonded securely at one end to the laminate and at the other end to the substrate, it is clear that the fiber should be compatible with the adhesive used in the laminate component production and that used in bonding the laminate to the self-supporting substrate.

Any adhesive known to possess these qualities may be used herein. We have found that hydrolyzed polyvinyl alcohol functions successfully with water-soluble impregnating resins and water-borne laminating adhesives. Cross-linking agents such as the alkoxylated alkyl melamines, e.g. hexakismethoxymethyl melamine alone or in the presence of an acidic catalyst may also be added to the polyvinyl alcohol adhesive to cross-link it and render the ultimate laminate more water-resistant. Glyoxal reactants may also be used for this purpose. Phenolic resin adhesives, dialkylphthalate based adhesives and the like may also be used as the flocking adhesive.

The flocked fibers useful herein can be produced from any fiber forming material. Those preferred are produced from cellulose, regenerated cellulose, rayon, nylon, cotton, polyester and the like. As mentioned above, the flock provides mechanical bond locking sites for the adhesive used to bond the substrate to the laminate or laminate component. The flock should not be too long because long sections of fiber tend to loop and become embedded in the flocking adhesive during heat and pressure consolidation of the laminate components. Generally, we have found that lengths of flock ranging from about $250\mu$ to about $375\mu$ are preferred; but those of from about $125\mu$ to about $1250\mu$ are satisfactory.

As mentioned above, the laminate components of the instant invention find use per se as cabinet liners, balance sheets etc. wherein they are adhered as such to the substrate with the application of pressure and usually heat. They also find use in the production of decorative laminates which are used for such applications as kitchen cabinets, vertical furniture surfaces, wall panels etc. wherein the covering provides all the necessary protection and decorative qualities required. When used to produce such decorative laminates, whether high pressure or low pressure, they are preferably topped with a conventional resin impregnated decor or print sheet which provides the decorative pattern of the final laminate. The flocked backed component and the decor sheet can be laminated together under conventional conditions to provide a thin, tough surfacing laminate, with or without a transparent overlay sheet on the decorative surface. Also, the flocked laminate component of this invention can provide the backmost sheet of a thicker decorative laminate which may find usage as a desk top, counter top etc. by heat and pressure consolidating it together with a plurality, i.e., 2–9, of resin impregnated core sheets. Typically, such core sheets are kraft paper and the impregnated resin is a phenol/-formaldehyde resin.

The decorative papers from which the low-pressure and high-pressure laminates are preferably produced are made from bleached wood pulp which is high, at least about 60%, in alpha cellulose content. The papers are pigmented in a known manner to obtain the desired levels of color and opacity. They generally range in basis weight from about 50–90 pounds per 3,000 square foot ream. They should have controlled pH within about 0.5 units of that of the impregnating resin in that variances in the pH of the paper and the resin can have adverse effects on the storage life of the treated paper and/or press cycle times when the laminate is being produced.

The decorative surface paper porosity (Gurley) is preferably controlled to 15–25 seconds per 100 cc of air to assure proper treating of the paper with the resin and pressing of the laminate. A paper having too high a porosity will allow too much resin to penetrate and will result in dry spots on the laminate produced therefrom. A paper with too low a porosity will not enable sufficient resin to penetrate and the excessive resin on the surface will cause a mottled appearance and surface crazing and/or cracking of the resultant laminate.

Impregnation of any of the paper sheets used in producing laminate components and drying of said impregnated papers may be effected by conventional treaters and driers, i.e., 80°–125° C. for 3–50 minutes. Vits treaters have been found to be particularly useful in this regard and achieve a high resin pick-up and uniform surface coating with sufficient surface resin to achieve an adequate abrasion resistance. The resin content of the impregnated papers generally ranges from about 30% to about 75%, by weight, based on the weight of the impregnated paper. Paper volatile levels are maintained at about 7% ± 0.5%. A balance between flow levels and treated weight of the treated paper is maintained to assure proper abrasion levels without reducing crack and/or craze resistance. Treated paper is dried and stored flat in a conditioned storage area.

Core material, i.e., self-supporting substrates useful in producing decorative low-pressure and high-pressure laminate include medium density, mat-formed, wood particleboard and medium density, wood fiberboard. Useful core material, however, merely must enable the production of full-sized, smooth-faced, well bonded, crack and craze resistant panels. Core materials should be stored for a sufficient time at ambient conditions to achieve an equilibrium temperature and an equilibrium moisture content of 7% ± 2.0. Metal substrates may also be used.

The components claimed herein may be placed on both sides or only on one side of the self-supporting substrate when low-pressure laminates are being produced. If the decorative sheet is placed only on one side of the substrate, it is preferred that a so-called balance sheet, i.e., a melamine/formaldehyde resin impregnated paper sheet, e.g., of kraft or other paper, sometimes called a cabinet liner, be placed on the other side in order to prevent the resultant panel from warping during pressing.

Various finishes may be applied to the decorative laminates. For example, the surface may be rendered glossy by using highly polished plates, matte by interposing a texturizing release sheet between the plates and the decorative sheet or embossed by using etched plates.

The following examples are set forth for purposes of illustration only and are not to be construed as limitations on the present invention except as set forth in the appended claims. All parts and percentages are by weight unless otherwise specified.

EXAMPLE 1

To a suitable vessel containing 150.0 parts of a solution comprising 55.0 parts of water, 12.0 parts of isopropanol and 33 parts of a melamine/formaldehyde resin (M/F ratio of 1:2) are added 100.0 parts of an emulsion comprising 50.0 parts of water and 50.0 parts of an ethyl acrylate-acrylonitrile copolymer containing reactive OH groups (Goodrich Co. Hycar ® 2600x138). The result is an overall composition is then used to impregnate wet-strength kraft paper having a basis weight of about 115 pounds per 3000 square foot ream, using a conventional Egan paper treating machine equipped with metering rolls. The gap of the metering rolls, temperature and air flow in the drying ovens are adjusted until the paper has picked up about 37% solids with a 7% volatile content. The dried paper is rolled up into a smooth even roll for subsequent use.

The roll is then remounted on the infeed end of the same treating machine and coated by a knife coater on its upper surface with a 10% solution of hot water-soluble, medium viscosity, substantially fully hydrolyzed polyvinyl alcohol. The coating is 0.004 inch thick in the wet state. When it is dried, it yields 0.7 gram/ft$^2$. While still wet, random cut cellulose flock fiber (a pulverized bleached sulfite softwood pulp with a mesh size of 200), 10–15 mils in length, is sprinkled on top of the wet coating by means of a hopper. The entire assembly is then vibrated by means of a beater bar so as to orient the flock perpendicular to the paper and implant the fibers into the coating. The excess flock is removed by vacuum. A 1.4 gram/ft$^2$ dry flock pick-up is achieved. The resultant flocked paper is then dried to a 3% volatile content in a conventional, hot air conveyorized oven at about 250° F., at a 1 minute residence time and cut to size. The result is thermosetting resin impregnated paper sheets each with a dry adhesive coating on one side thereof and having flocked fibers implanted in said adhesive in perpendicular orientation to said sheets. The sheets are now ready to be used as a laminate component in the production of high or low pressure laminates.

HIGH-PRESSURE LAMINATE

A sheet, produced as above, is then arranged in a press assembly so that the flocked surface thereof will become the rear face of the final laminate. The assembly is prepared by laying the flocked sheet atop a 1 mil polypropylene release sheet with the flocked surface adjacent the polypropylene. Atop this structure is laid printed decor sheet prepared from a printed 65 lb./3000 ft.$^2$ pigmented α-cellulose paper which has been impregnated with the same melamine-acrylic composition set forth above and dried. A two-sided glassine release sheet is placed upon the decor sheet and the build-up is then repeated in reverse order until another polypropylene sheet is reached. The procedure is continued until forty assemblies are produced. Kraft paper "cushions" are placed outside the top and bottom of the resultant "press pack" and finally, 3/8 inch steel plates are used as "outside irons". The resultant assembly is called a "plateless pack" or a "veneer pack". It is 4 feet wide and 8 feet long and is placed in a high pressure laminating press. The pack is heat and pressure consolidated at 1400 psi and 150° C. for 5–6 minutes. The pack is then cooled to room temperature, removed from the press and trimmed at both ends and edges with an overhead travel saw. The individual laminates are separated from one another at the polypropylene and glassine interfaces.

Upon removal from the press, the flocked fibers are compacted and forced into a position parallel to the plane of the laminate. Upon wetting with water or upon the addition of an adhesive in an aqueous solution, the fibers immediately return to a position substantially perpendicular to the laminate plane.

A. One of the recovered laminates is bonded to both planar faces of a medium density particleboard slab, ¾ inch thick and 4 feet×8 feet in width and length, respectively, using a polyvinylacetate emulsion adhesive, commonly called white glue. The glue has a spread rate of 19/grams/ft.$^2$ and the layers are held together at 40 psi for 30 minutes. The resultant structure is allowed to remain at ambient conditions for one week. The rearmost, flocked surfaces of the laminates are adjacent the white glue line and the decorative surfaces thereof are visible.

Small 15 inch by 15 inch sections are cut from the structure and placed in a cabinet at 110° F., 10% R.H. and observed weekly for signs of separation of the laminate from the substrate. No failure is detected after 15 weeks.

B. A second laminate is bonded to both faces of a 4 feet×8 feet, ¾ inch exterior grade plywood substrate as in Section A, above, by means of a commerically available, highly water-resistant, neoprene contact achesive commonly employed for the purpose. The resultant structure is allowed to equilibrate at ambient conditions for seven days. Specimens 2 inches×3 inches are then cut from the structures and small screw eyes are attached to the center of one of the 2 inch ends of the plywood core. The other end is fitted with a lead weight so that the entire specimen would sink when suspended on the screw eye and lowered into water. The specimens are mounted on hooks above a water bath at 150° F. which is automatically activated to immerse them for 15 minutes and then withdraw them to a position about one inch above the bath for 45 minutes. The cycle is repeated until failure of the polyvinyl alcohol bond between the flock fiber and the laminate. The specimens failed after 27 cycles indicating that the polyvinyl alchol used to bond the flock to the paper layer is not sufficiently water resistant to permit usage of the structure under constantly moist conditions, such as in a shower stall and on a kitchen drain board.

C. One-foot square sections are cut from one of the above-produced laminates and bonded onto ¾ inch, 11 inches×11 inches medium density particleboard sections so as to have a ½ inch border of the laminate overhanging the particleboard. The same "white glue" as described above is used. The samples are allowed to remain at ambient conditions for 24 hours. In order to test the bond between the board and the laminate, a saw cut is made, through the laminate only, at a 45° angle to and intersecting the edge at 3 inches from each corner. By means of a fixture, the structure is then pushed upward by means of its overhanging border in such a way as to place the adhesive joint in tension and to separate the laminate from the particleboard. Since the thin laminate lacks sufficient tensile strength to cause the particleboard to fail, each triangular section at each corner is reinforced by bonding to its upper surface a section of standard 1/16 inch decorative laminate. One of each of the corners is stripped apart after 24, 48, 72 and 96 hours following the bonding operation. When the laminate is forced away from the particleboard, substantial amounts of wood particles are torn out, thereby showing that the adhesive joint strength exceeds the internal strength of the particleboard itself.

LOW-PRESSURE LAMINATE

The impregnation procedure set forth above is again repeated except that the kraft sheet is replaced by a printed 65 lb./3000 ft.² pigmented α-cellulose decor paper which has a wood grain pattern printed on one side thereof. The decor paper is impregnated with the same melamine-acrylic impregnating resin composition, dried, coated with hydrolyzed polyvinyl alcohol adhesive and flocked on the side opposite the decorative pattern.

The flocked sheet is placed upon a section of ¾ inch thick particleboard of medium density and placed in a low-pressure panel press utilzing a suitable release sheet on top of the decor sheet. The composite is laminated at 410 psi and 140° C. for 1–2 minutes. No failure of the bond is observed when the resultant panel is tested at 110° F. and 10% R.H. after 15 weeks, as above.

EXAMPLE 2

The procedure of Example 1 is again followed except that the polyvinyl alcohol adhesive is modified by the addition of a cross-linker/insolubilizer thereto. To each 85.0 parts of the adhesive are added 15.0 parts of hexakis methoxymethyl melamine and 0.3 part of p-toluenesulfonic acid to achieve the result. Upon subjection of the resultant structure to the repeated immersion test, 72 cycles are reached without deterioration of the adhesive bond.

EXAMPLE 3

Again following the procedure of Example 1 except that the polyvinyl alcohol adhesive is modified by adding 10.0 parts of glyoxal to every 90.0 parts of adhesive, the resultant structure withstands 72 immersion cycles without failure.

EXAMPLE 4

The procedure of Example 1 is followed except that the high pressure laminate build-up comprises, in superimposed relationship, 1 sheet of flocked, impregnated kraft paper, 7 sheets of impregnated kraft paper core, 1 sheet of impregnated α-cellulose decor paper and 1 sheet of impregnated, transparent overlay paper. These build-ups are repeated with a ⅛ inch polished steel plate between each one until a complete press pack is produced. After heat and pressure consolidation, the resultant laminates are recovered. Each laminate has a flocked backmost side which shows bonding characteristics similar to the laminates of Example 1 when subjected to the tests described therein.

EXAMPLE 5

The procedure of Example 1 is followed except that a standard low-pressure melamine/formaldehyde resin is employed to impregnate the laminate component sheets. The mol ratio of melamine to formaldehyde is 1.0 : 1.7. Similar results are again achieved.

EXAMPLE 6

The operations of Example 1 are again followed except that the kraft paper is impregnated with a conventional phenolic laminating varnish to a resin content of 30%, a volatile content of 8% and a minimum flow of 5%. The so-impregnated paper is coated on one side with a 30% aqueous solution of a water-soluble phenolic resin which is thickened by the addition of 1% β-hydroxyethyl cellulose (Natrosol 250®; Viscosity Type H; 1% NaOH; Hercules Chem. Co.). The thickened resin solution is applied at a wet thickness of about 1 mil and yields a dry coated equivalent of 0.7 grams/ft.². A rayon flock of random grey color and 30–200 mesh is sprinkled onto the wet phenolic coating and the resultant sheet is passed through a conveyor oven for 10 minutes at 240° F. to dry and cure the phenolic used to bond the flock but to leave the impregnated phenolic within the sheet essentially unchanged.

The resultant flocked sheet is then used as the rearmost ply of a conventional high pressure laminate. To produce the laminate, 6 plies of a 115 pound kraft paper, impregnated with phenolic resin in a typical manner and dried, are positioned above the flocked kraft with the unflocked side adjacent the six kraft plies. Conventional melamine/-formaldehyde resin impregnated decor and overlay sheets are then placed atop the 6 plies of kraft. The topmost overlay sheet is covered with a stainless steel press plate and a 1 mil film of polypropylene is placed adjacent the flocked side of the lowermost kraft sheet. This assembly is repeated in a face-to-back arrangement until 12 laminate packs are assembled. They are then consolidated under the usual conditions of heat and pressure. Upon cooling and disassembly, the laminates are ready for adhesive bonding to any desired substrate without the need for sanding the back, polishing the face or other finishing operation except trimming. When bonded to particleboard as in Example 1, the finished structures resist exposure in the low humidity cabinet, withstand 72 immersion cycles and exhibit wood particle failure.

EXAMPLE 7

A paper composed of about 80% of a fibrillated acrylic fiber (see U.S. Pat. No. 3,264,170), containing about 20.0% of titanium dioxide and having a basis weight of 90 lbs./3000 ft.$^2$ ream is gravure printed with a woodgrain pattern.

The resultant printed paper is passed into a bath of a commercially available solution comprising 96.0 parts of a dialkylphthalate prepolymer and 4.0 parts of diallylphthalate monomer, 5.0 parts of dicumyl peroxide in 68.0 parts of methyl ethyl ketone and 17.0 parts of toluene. The printed surface is allowed to take up and return as much resin as it can but the back surface is wiped of excess resin with a metal rod. The paper is dried. Analysis shows a resin pick-up of 50% of the total weight, i.e., about 13.5 grams of dry resin per square foot. The printed surface retains about 8.0 grams and the body of the paper about 5.5 grams. Essentially no resin is retained on the back surface.

A 120 lb./3000 ft.$^2$ fibrillated acrylic paper, as above but free of pigmentation, is coated with a diallylphthalate polymer solution similar to that disclosed above except that the solvents are each reduced to one third of the amount tated. The coating rate is such that 2.0 grams of resin solids is deposited per square foot of paper. While still wet, the coating is sprinkled with polyester fiber flock, 100 mesh, of random grey color. The wet flock add-on is 1.4 grams/ft.$^2$. The flocked paper is passed through a conveyorized hot air oven at 280° F. at a 10 minute residence time, whereby the resin adhesive binder is completely cross-linked. The roll is cooled and then mounted on a reverse roll coater and the same diallyl phthalate resin solution as first mentioned above is applied to the unflocked surface. The resin pick-up is adjusted to add 4.5 grams/ft.$^2$ and the paper is dried.

A 4 feet×8 feet sheet of the unflocked decor paper is placed adjacent a stainless steel press plate with its decorative side against the plate. A 4 feet×8 feet sheet of the flocked paper with its unflocked surface adjacent the decor paper is then placed on top of the decor sheet. A 1 mil sheet of polypropylene is used as a separator and the entire assembly is repeated in reverse. Six more pairs of such sheets are arranged in back-to-back relationship with faces separated by additional polished plates. The entire press mass is then consolidated under heat and pressure.

After cooling, the laminates are separated and trimmed. By means of a conventional, commercially available chloroprene solution "contact bond" adhesive, a laminate is bonded to a 1/16 inch thick aluminum plate which has been carefully cleaned and degreased. A similar structure is prepared using a 1/16 inch thick cold rolled steel plate. In both instances, the flocked side of the laminate is in contact with the metal surface. The structures are aged 7 days at ambient temperature. Samples are cut from the resultant structures and submitted to the repeated immersion test of Example 1. After 72 cycles, no evidence of separation can be detected.

EXAMPLE 8

The procedure of Example 1 is again followed except that the resinous material impregnated into the kraft paper and decorative sheet is a commercially available polyester resin and said adhesive is a polyester resin. Again, an excellent high pressure laminate is produced.

EXAMPLES 9–11

The procedure of Example 2 is again follwed except that the flock fiber is (9) a polyester, (10) a nylon and (11) a cellulose acetate. In each instance, excellent bonding is achieved when the resultant laminate is adhered to a particleboard substrate.

We claim:
1. An article of manufacture comprising a heat and pressure consolidated assembly comprising, in superimposed relationship,
   1. a thermoset resin impregnated, decorative paper layer and
   2. a thermoset resin impregnated paper sheet having
      a. a dry adhesive coating positioned on the side thereof opposite said paper layer and
      b. flocked fibers implanted in said adhesive in generally a perpendicular orientation to said sheet, said adhesive being substantially non-flowable in the dry state when subjected to the heat and pressure of high or low pressure decorative laminating.
2. An article according to claim 1 wherein a plurality of thermoset resin impregnated core sheets are positioned between said (1) and said (2).
3. An article according to claim 2 wherein a thermoset resin impregnated overlay sheet is positioned atop said decorative paper layer.
4. An article according to claim 3 wherein said assembly is adhesively bonded to a self-supporting substrate, said flocked fibers being positioned adjaced said substrate.
5. An article according to claim 2 wherein said assembly is adhesively bonded to a self-supporting substrate, said flocked fibers being positioned adjacent said substrate.
6. An article according to claim 1 wherein a thermoset resin impregnated overlay sheet is positioned atop said decorative paper layer.
7. An article according to claim 6 wherein said assembly is adhesively bonded to a self-supporting substrate, said flocked fibers being positioned adjacent said substrate.
8. An article according to claim 1 wherein said assembly is adhesively bonded to a self-supporting substrate, said flocked fibers being positioned adjacent said substrate.
9. A method for the production of the article of claim 1 which comprises heat and pressure consolidating, in a superimposed relationship, an assembly comprising:
   1. a dry thermosetting resin impregnated decorative paper layer and
   2. a dry thermosetting resin impegnated paper sheet having
      a. a dry adhesive coating positioned on the side thereof opposite said paper layer and
      b. flocked fibers implanted in said adhesive in generally a perpendicular orientation to said sheet
said adhesive being substantially non-flowable in the dry state when subjected to the heat and pressure of high or low pressure decorative laminating.

* * * * *